(12) United States Patent
Satish

(10) Patent No.: US 9,152,703 B1
(45) Date of Patent: Oct. 6, 2015

(54) SYSTEMS AND METHODS FOR CLUSTERING DATA SAMPLES

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 388 days.

(21) Appl. No.: 13/780,765

(22) Filed: Feb. 28, 2013

(51) Int. Cl.
*G06F 17/30* (2006.01)
*G06F 7/00* (2006.01)
*G06Q 30/00* (2012.01)

(52) U.S. Cl.
CPC ...... *G06F 17/30705* (2013.01); *G06Q 30/0185* (2013.01)

(58) Field of Classification Search
CPC .................................................. G06F 17/30
USPC ........................................................ 726/22
See application file for complete search history.

(56) References Cited

U.S. PATENT DOCUMENTS

| | | | | |
|---|---|---|---|---|
| 7,809,670 | B2 * | 10/2010 | Lee et al. | 706/59 |
| 8,561,193 | B1 | 10/2013 | Srivastava et al. | |
| 8,627,469 | B1 | 1/2014 | Chen et al. | |
| 2011/0271341 | A1 | 11/2011 | Satish et al. | |
| 2011/0283361 | A1 * | 11/2011 | Perdisci et al. | 726/24 |

OTHER PUBLICATIONS

"Cloud-Based Malware Detection for Evolving Data Streams", ACM Transactions on Management Information Systems, vol. 2, No. 3, Article 16, Oct. 2011.*

Sourabh Satish; Systems and Methods for Predicting Optimum Run Times for Software Samples; U.S. Appl. No. 13/794,720, filed Mar. 11, 2013.

Barbará, Daniel, "Requirements for Clustering Data Streams", http://www.cs.iastate.edu/~honavar/datastreamcluster.pdf, as accessed Jan. 14, 2014, SIGKDD Explorations, vol. 3, Issue 2, (Jan. 2002), pp. 23-27.

Nguyen, Hai-Long et al., "Concurrent Semi-supervised Learning of Data Streams", http://link.springer.com/chapter/10.1007%2F978-3-642-23544-3_34, as accessed Jan. 14, 2014, Data Warehousing and Knowledge Discovery, 13th International Conference, DaWaK 2011, Lecture Notes in Computer Science vol. 6862, Springer Berlin Heidelberg, Toulouse, France, (Aug. 29-Sep. 2, 2011), pp. 445-459.

(Continued)

*Primary Examiner* — Apu Mofiz
*Assistant Examiner* — Farhad Agharahimi
(74) *Attorney, Agent, or Firm* — ALG Intellectual Property, LLC

(57) ABSTRACT

A computer-implemented method for clustering data samples may include (1) identifying a plurality of samples, (2) identifying a plurality of candidate features, (3) identifying a plurality of candidate distance functions, (4) selecting a distance function by (i) selecting a set of features based on determining that a result of clustering a training set of samples using the set of features and the distance function fits an expected clustering of the training set of samples more closely than results from using an alternative set of features and (ii) determining that the result of clustering the training set using the set of features and the distance function fits the expected clustering of the training set of samples more closely than a best result of any other distance function, and (5) clustering the plurality of samples using the set of features and the distance function. Various other methods and systems are also disclosed.

20 Claims, 6 Drawing Sheets

(56) References Cited

OTHER PUBLICATIONS

Valko, Michal et al., "Online Semi-Supervised Learning on Quantized Graphs", http://arxiv.org/ftp/arxiv/papers/1203/1203.3522.pdf, as accessed Jan. 14, 2014, Proceedings of the Twenty-Sixth Conference on Uncertainty in Artificial Intelligence (UAI2010), AUAI Press, Catalina Island, CA, (Jul. 8-11, 2010).

Goldberg, Andrew B., "OASIS: Online Active Semi-Supervised Learning", http://pages.cs.wisc.edu/~jerryzhu/pub/oasis.pdf, as accessed Jan. 14, 2014, Association for the Advancement of Artificial Intelligence, (2011).

Kholghi, Mahnoosh et al., "Active Learning Framework Combining Semi-Supervised Approach for Data Stream Mining", http://link.springer.com/chapter/10.1007%2F978-3-642-18134-4_38, as accessed Jan. 14, 2014, Intelligent Computing and Information Science, International Conference, ICICIS 2011, Proceedings, Part II, Communications in Computer and Information Science vol. 135, Springer Berlin Heidelberg, Chongqing, China, (Jan. 8-9, 2011), pp. 238-243.

Hu, Xin et al., "MutantX-S: Scalable Malware Clustering Based on Static Features", http://0b4af6cdc2f0c5998459-c0245c5c937c5dedcca3f1764ecc9b2f.r43.cf2.rackcdn.com/11753-atc13-hu.pdf, as accessed Jan. 14, 2014, 2013 USENIX Annual Technical Conference (USENIX ATC '13), USENIX Association, (2013), pp. 187-198.

Joseph H. Chen; Systems and Methods for Preventing Positive Malware Identification; U.S. Appl. No. 14/197,877, filed Mar. 5, 2014.

Sourabh Satish; Systems and Methods for Updating Generic File-Classification Definitions; U.S. Appl. No. 14/210,364, filed Mar. 13, 2014.

Gonzalez, Teofilo F., "Clustering to Minimize the Maximum Intercluster Distance", https://www.cs.ucsb.edu/~teo/papers/Ktmm.pdf, as accessed Jan. 14, 2014, Theoretical Computer Science 38, North-Holland, Elsevier Science Publishers B.V., (1985), pp. 293-306.

Satish, Sourabh, "Behavioral Security: 10 steps forward 5 steps backward", DeepSec IDSC 2011, Vienna, Austria, (Nov. 15-18, 2011).

You, Chao et al., "An Approach to Detect Malicious Behaviors by Evading Stalling Code", TELKOMNIKA, vol. 10, No. 7, (Nov. 2012), pp. 1766-1770.

Sourabh Satish, et al.; Systems and Methods for Clustering Data; U.S. Appl. No. 14/214,581, filed Mar. 14, 2014.

Wikipedia; Cluster Analysis; http://en.wikipedia.org/wiki/Data_clustering#Comparisons_between_data_clusterings; as accessed on Nov. 29, 2012.

Zeinab Khorshidpour et al.; An Evolvable-Clustering-Based Algorithm to Learn Distance Function for Supervised Environment; IJCSI International Journal of Computer Science Issues, vol. 7, Issue 5; pp. 374-381; Sep. 2010.

* cited by examiner

SYSTEMS AND METHODS FOR CLUSTERING DATA SAMPLES

BACKGROUND

In the information age, individuals and organizations increasingly store, manage, and analyze large amounts of data. Sometimes an organization may wish to discover relationships between a number of data samples and/or to classify these data samples in a systematic and meaningful way.

Clustering techniques may automatically group a set of data samples by their similarity and/or coherence across a number of dimensions. Such techniques may find application in a wide array of scientific, technological, and other research endeavors.

Variations in clustering techniques may produce significantly different results. For example, the choice of a distance function (e.g., that specifies the similarity between any two data samples) may impact the cluster in which one or more data samples are ultimately placed. Likewise, a data sample may have many identifiable attributes, some of which may improve cluster quality, and some of which may only add noise and/or produce misleading classification results when clustering. Traditional clustering technologies have failed to produce a "one-method-fits-all" approach that yields the optimal clustering results in every domain.

Accordingly, the instant disclosure identifies and addresses a need for additional and improved systems and methods for clustering data samples.

SUMMARY

As will be described in greater detail below, the instant disclosure generally relates to systems and methods for clustering data samples by iterating through candidate features of data samples to determine which combination of features will produce the best clustering results (e.g., based on how closely the clustering results align with classifications when applied to a pre-classified training set of data samples) for a given distance function; and iterating through candidate distance functions to determine which distance function produces the best clustering results when applied with its best combination of features.

In one example, a computer-implemented method for clustering data samples may include (1) identifying a plurality of samples to cluster, (2) identifying a plurality of candidate features for clustering the plurality of samples, (3) identifying a plurality of candidate distance functions for clustering the plurality of samples, (4) selecting a distance function from the plurality of candidate distance functions for clustering the plurality of samples at least in part by (i) selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric and (ii) determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric, and (5) clustering the plurality of samples using the set of features and the distance function.

In one example, the set of features may include a subset of the plurality of features and the alternative set of features may include the subset and an additional feature from within the plurality of features. In this example, selecting the set of features may include adding the additional feature with the set of features to create the alternative set of features to determine whether the additional feature improves on the result of clustering according to the predefined clustering accuracy metric.

In one example, the alternative set of features may include a subset of the plurality of features and the set of features may include the subset and an additional feature from within the plurality of features. In this example, selecting the set of features may include adding the additional feature with the alternative set of features to create the set of features to determine whether the additional feature improves upon the result of clustering according to the predefined clustering accuracy metric.

In one example, the plurality of samples may include a plurality of malware samples, and the training set of samples may include a set of malware variants from a plurality of malware families. In this example, the predefined clustering accuracy metric may include a level of correspondence between at least one cluster of the plurality of malware samples and at least one malware family of the plurality of malware families.

In one example, selecting the set of features may include (1) ordering the plurality of candidate features by single-feature clustering efficacy to create an ordered list of candidate features and (2) iterating through the ordered list of candidate features and adding to the set of features each candidate feature from the ordered list of candidate features that improves clustering of the training set of samples when added to the set of features.

In one example, the predefined clustering accuracy metric may include a measure of inter-cluster distance and/or a measure of intra-cluster closeness.

In one example, the computer-implemented method may further include classifying at least one sample within the plurality of samples according to a cluster in which the samples falls after clustering the plurality of samples using the set of features and the distance function.

In one embodiment, a system for implementing the above-described method may include (1) an identification module programmed to: (i) identify a plurality of samples to cluster, (ii) identify a plurality of candidate features for clustering the plurality of samples, and (iii) identify a plurality of candidate distance functions for clustering the plurality of samples; (2) a selection module programmed to select a distance function from the plurality of candidate distance functions for clustering the plurality of samples at least in part by (i) selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric and (ii) determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric; and (3) a clustering module programmed to cluster the plurality of samples using the set of features and the distance function. The system may also include at least one processor configured to execute the identification module, the selection module, and the clustering module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a plurality of samples to cluster, (2) identify a plurality of candidate features for clustering the plurality of samples, (3) identify a plurality of candidate distance functions for clustering the plurality of samples, (4) select a distance function from the plurality of candidate distance functions for clustering the plurality of samples at least in part by (i) selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric and (ii) determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric, and (5) cluster the plurality of samples using the set of features and the distance function.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
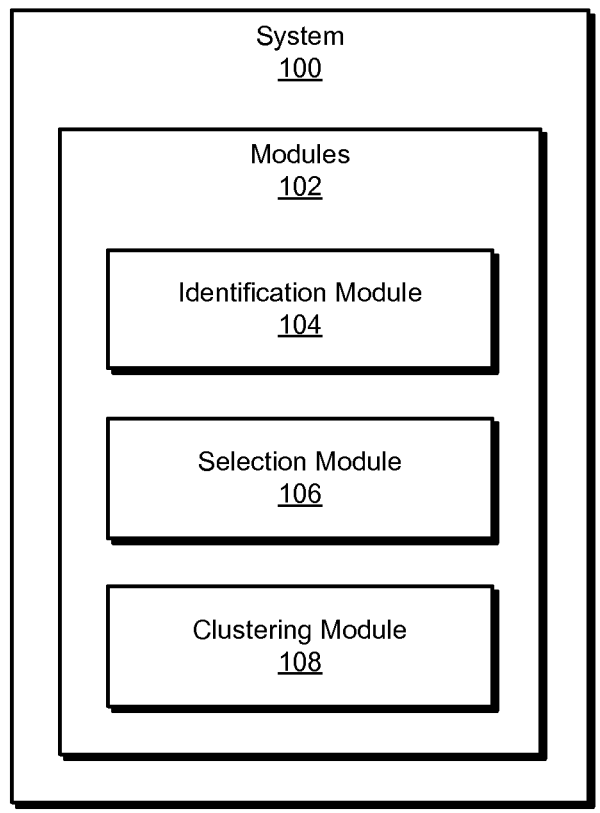
FIG. 1 is a block diagram of an exemplary system for clustering data samples.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for clustering data samples. As will be explained in greater detail below, by iterating through candidate features of data samples to determine which combination of features will produce the best clustering results (e.g., based on how closely the clustering results align with classifications when applied to a pre-classified training set of data samples) for a given distance function, and iterating through candidate distance functions to determine which distance function produces the best clustering results when applied with its best combination of features, the systems and methods described herein may potentially significantly improve clustering performance.

Figure 2:
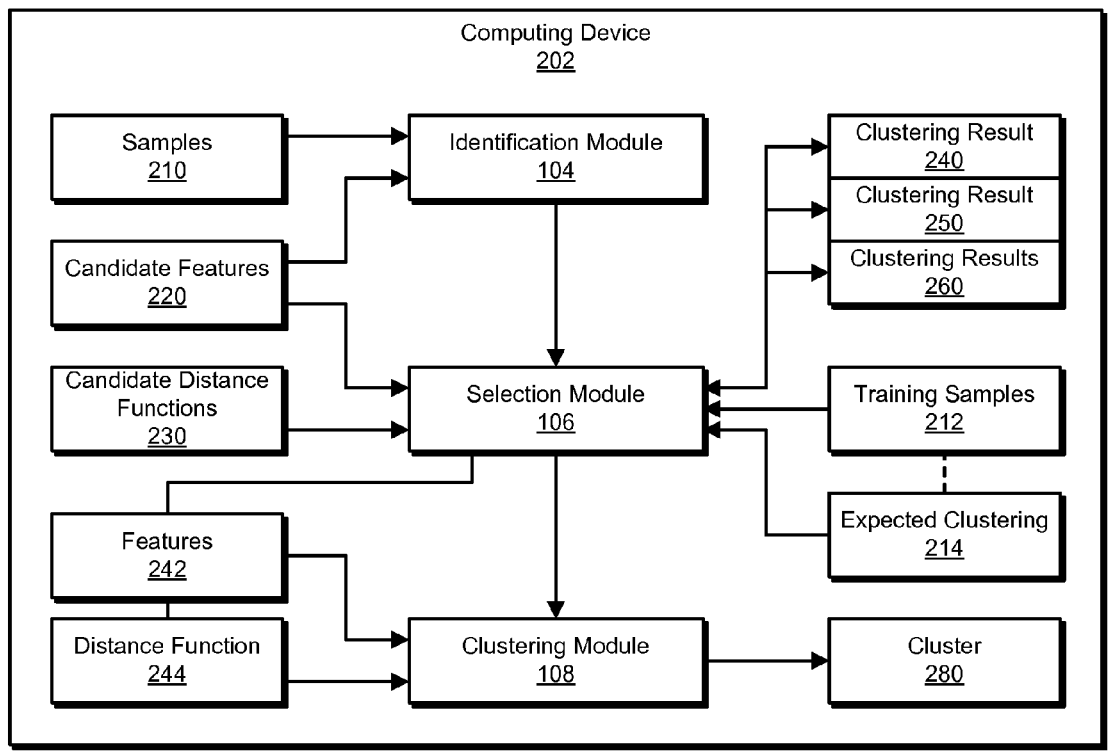
FIG. 2 is a block diagram of an exemplary system for clustering data samples.

The following will provide, with reference to FIGS. 1-2, detailed descriptions of exemplary systems for clustering data samples. Detailed descriptions of corresponding computer-implemented methods will also be provided in connection with FIG. 3. Detailed descriptions of an exemplary clustering will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for clustering data samples. As illustrated in this figure, exemplary system 100 may include one or more modules 102 for performing one or more tasks. For example, and as will be explained in greater detail below, exemplary system 100 may include an identification module 104 programmed to (1) identify a plurality of samples to cluster, (2) identify a plurality of candidate features for clustering the plurality of samples, and (3) identify a plurality of candidate distance functions for clustering the plurality of samples. Exemplary system 100 may also include a selection module 106 programmed to select a distance function from the plurality of candidate distance functions for clustering the plurality of samples at least in part by (1) selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric and (2) determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric.

In addition, and as will be described in greater detail below, exemplary system 100 may include a clustering module programmed to cluster the plurality of samples using the set of features and the distance function. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. Computing device 202 may be programmed with one or more of modules 102.

In one embodiment, one or more of modules 102 from FIG. 1 may, when executed by at least one processor of computing device 202, facilitate computing device 202 in clustering data samples. For example, and as will be described in greater detail below, one or more of modules 102 may cause computing device 202 to 1) identify samples 210 to cluster, 2) identify candidate features 220 for clustering samples 210, 3) identify candidate distance functions 230 for clustering samples 210, 4) select a distance function 244 from candidate distance functions 230 for clustering samples 210 at least in part by (i) selecting features 242 from candidate features 220 for clustering samples 210 based at least in part on determining that a clustering result 240 of clustering training samples 212 using features 242 and distance function 244 fits an expected clustering 214 of training samples 212 more closely than a clustering result 250 of clustering training samples 212 using an alternative set of features from candidate features 220 and distance function 244, according to a predefined clustering accuracy metric and (ii) determining that clustering result 240 of clustering training samples 212 using features 242 and distance function 244 fits expected clustering 214 of training samples 212 more closely than clustering results 260 of clustering training samples 212 for each of candidate distance functions 230, aside from distance function 244, according to the predefined clustering accuracy metric, and (5) cluster samples 210 using features 242 and distance function 244.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Figure 3:
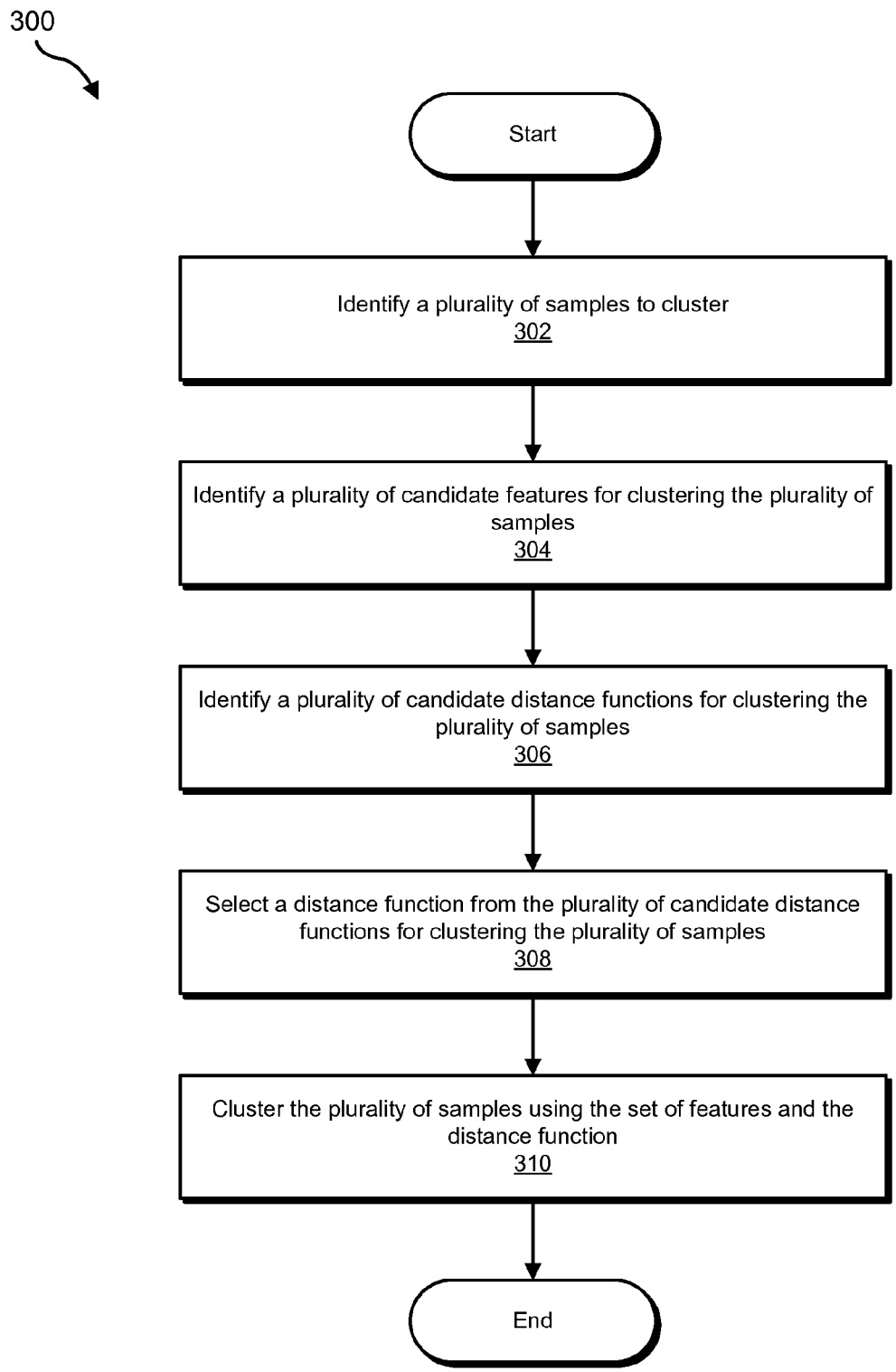
FIG. 3 is a flow diagram of an exemplary method for clustering data samples.

FIG. 3 is a flow diagram of an exemplary computer-implemented method 300 for clustering data samples. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a plurality of samples to cluster. For example, at step 302 identification module 104 may, as part of computing device 202 in FIG. 2, identify samples 210 to cluster.

As used herein, the term "sample" may refer to any data object, document, data record, and/or vector that may be reduced to a set of features and clustered. Examples of samples may include, without limitation, malware samples, web pages, customer records, digital images, social networking profiles, and computing platform profiles.

As used herein, the term "clustering" may refer to any process of grouping a set of samples by their similarity and/or coherence across a number of dimensions. For example, the term "clustering" may refer to connectivity-based clustering.

Identification module 104 may identify the plurality of samples in any suitable manner. For example, identification module 104 may identify the plurality of samples within a database. Additionally or alternatively, identification module 104 may collect the plurality of samples as a part of a data mining operation. In some examples, identification module 104 may receive the plurality of samples from a plurality of remote agents.

Returning to FIG. 3, at step 304 one or more of the systems described herein may identify a plurality of candidate features for clustering the plurality of samples. For example, at step 304 identification module 104 may, as part of computing device 202 in FIG. 2, identify candidate features 220 for clustering samples 210.

As used herein, the term "feature" may refer to any feature, attribute, dimension, metadata, and/or property of a sample. In some examples, the term "feature" may refer to a vector element and/or a scalar and/or binary value. As used herein, the phrase "candidate feature" may include any known feature of samples that may potentially be used to cluster the samples.

Identification module 104 may identify the plurality of candidate features in any suitable manner. For example, identification module 104 may identify features of the plurality of samples that have already been identified and/or computed. Additionally or alternatively, identification module 104 may identify one or more functions for generating the features of the plurality of samples from the samples.

Returning to FIG. 3, at step 306 one or more of the systems described herein may identify a plurality of candidate distance functions for clustering the plurality of samples. For example, at step 306 identification module 104 may, as part of computing device 202 in FIG. 2, identify candidate distance functions 230 for clustering samples 210.

As used herein, the phrase "distance function" may refer to any function that defines the distance between samples (e.g., based on a set of features of the samples). Examples of distance functions include, without limitation, Euclidean distance, squared Euclidean distance, and cosine similarity. As used herein, the phrase "candidate distance function" may include any known distance function that may potentially be used to cluster the samples.

Identification module 104 may identify the plurality of candidate distance functions in any suitable manner. For example, identification module 104 may identify the plurality of distance functions encoded as a software library of distance functions.

Returning to FIG. 3, at step 308 one or more of the systems described herein may select a distance function from the plurality of candidate distance functions for clustering the plurality of samples at least in part by (i) selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric and (ii) determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric. For example, at step 308 selection module 106 may, as part of computing device 202 in FIG. 2, select a distance function 244 from candidate distance functions 230 for clustering samples 210 at least in part by (i) selecting features 242 from candidate features 220 for clustering samples 210 based at least in part on determining that a clustering result 240 of clustering training samples 212 using features 242 and distance function 244 fits an expected clustering 214 of training samples 212 more closely than a clustering result 250 of clustering training samples 212 using an alternative set of features from candidate features 220 and distance function 244, according to a predefined clustering accuracy metric and (ii) determining that clustering result 240 of clustering training samples 212 using features 242 and distance function 244 fits expected clustering 214 of training samples 212 more closely than clustering results 260 of clustering training samples 212 for each of candidate distance functions 230, aside from distance function 244, according to the predefined clustering accuracy metric.

As used herein, the phrase "training set" may refer to any set of data with one or more properties which may be used to evaluate attempts to cluster the training set using specified parameters (e.g., and, therefore, to evaluate the usefulness of the specified parameters for clustering data that is similar and/or related to the training set).

As used herein, the phrase "clustering accuracy metric" may refer to any of a variety of metrics and/or criteria for determining how well a clustering attempt using specified parameters has performed. For example, samples from the training set may have been pre-classified. Accordingly, attempts to cluster the training set samples may be evaluated by how closely membership in a given cluster corresponds to a given classification (e.g., how many samples of the same classification are placed in the same cluster). As mentioned earlier, in some examples, the plurality of samples may include a plurality of malware samples. In these examples, the training set of samples may include a set of malware variants from a plurality of malware families. The training set of samples may have been pre-classified according to their malware families. Accordingly, the predefined clustering accuracy metric may include a correspondence between at least one cluster of the plurality of malware samples and at least one malware family of the plurality of malware families.

Figure 4:
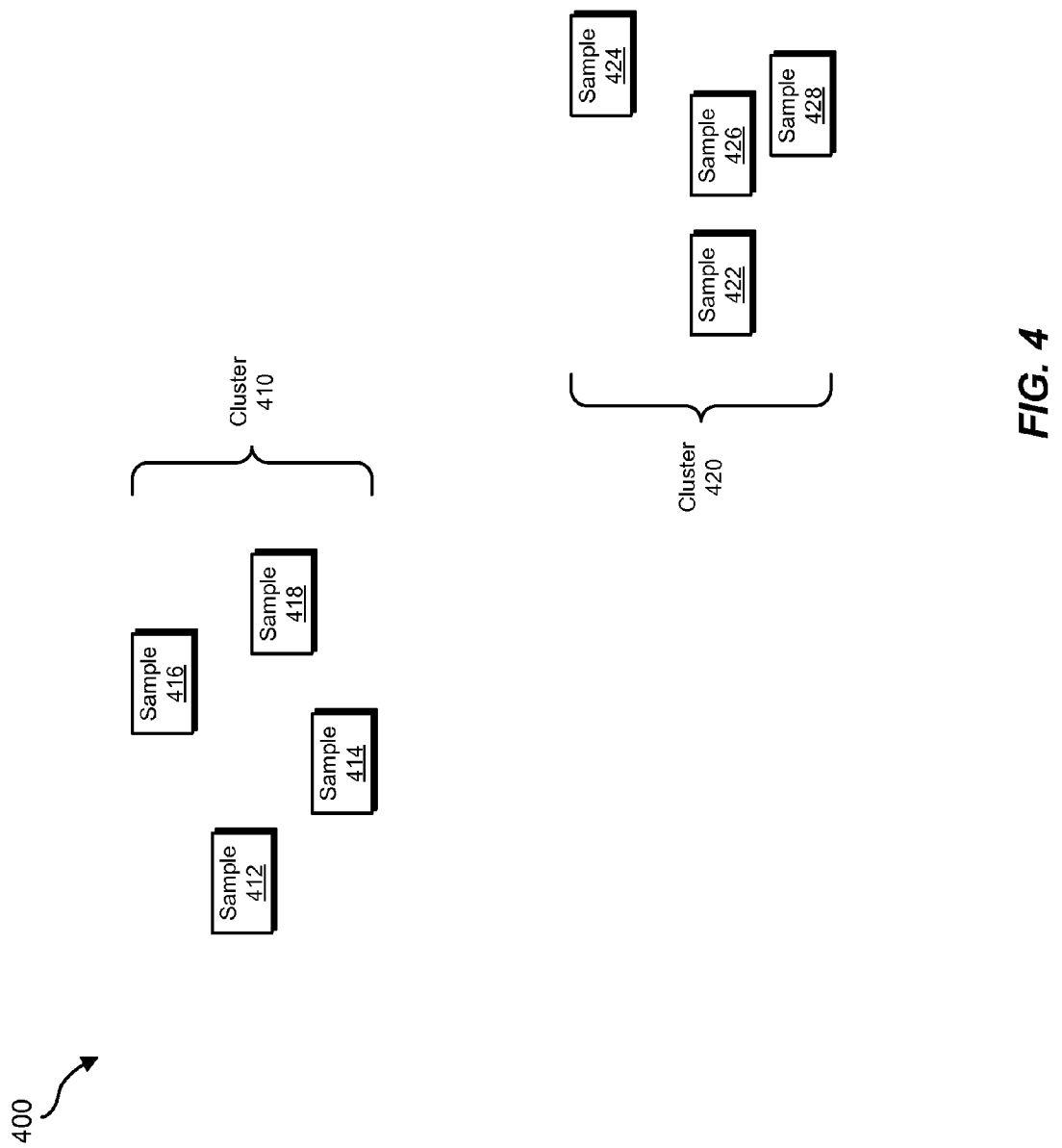
FIG. 4 is a diagram of an exemplary clustering.

FIG. 4 illustrates an exemplary clustering 400. As shown in FIG. 4, clustering 400 may include a cluster 410 including samples 412, 414, 416, and 418; and a cluster 420 including samples 422, 424, 426, and 428. Using FIG. 4 as an example, selection module 106 may score clustering 400 highly if samples 412, 414, 416, and 418 share one classification and samples 422, 424, 426, and 428 share another classification, because memberships in the respective clusters may correlate with correct classifications. However, if samples 412, 414, 422, and 424 share one classification and samples 416, 418, 426, and 428 share another classification, selection module 106 may score clustering 400 low due to a low correlation between clusters and correct classifications.

In some examples, the clustering accuracy metric may also include a measure of inter-cluster distance and/or a measure of intra-cluster distance. For example, the clustering accuracy metric may indicate that well-defined clusters (e.g., where samples within a cluster are close to each other, but distinct clusters are distant from each other) are superior to less-defined clusters (e.g., samples within a cluster are relatively distant from each other, while distinct clusters are relatively close to each other).

Selection module 106 may arrive at selecting the set of features in any suitable manner. For example, the set of features may include a subset of the plurality of features and the alternative set of features may include the subset and an additional feature from within the plurality of features. In this example, selecting the set of features may include adding the additional feature with the set of features to create the alternative set of features to determine whether the additional feature improves on the result of clustering according to the predefined clustering accuracy metric. Selection module 106 may then determine that adding the additional feature to the set of features does not improve on the clustering results according to the clustering accuracy metric, and, thus, selection module 106 may select the set of features over the alternative set of features.

In another, the alternative set of features may include a subset of the plurality of features and the set of features may include the subset and an additional feature from within the plurality of features. In this example, selecting the set of features may include adding the additional feature with the alternative set of features to create the set of features to determine whether the additional feature improves upon the result of clustering according to the predefined clustering accuracy metric. Selection module 106 may then determine that adding the additional feature to the alternative set of features improves on the clustering results according to the clustering accuracy metric, and, thus, selection module 106 may select the set of features over the alternative set of features.

In some examples, selection module 106 may iterate through all the candidate features, progressively adding each candidate feature that improves on the set of features to the set of features. For example, selecting the set of features may include 1) ordering the plurality of candidate features by single-feature clustering efficacy to create an ordered list of candidate features and 2) iterating through the ordered list of candidate features and adding to the set of features each candidate feature from the ordered list of candidate features that improves clustering of the training set of samples when added to the set of features. selection module 106 may determine the single-feature clustering efficacy of each candidate feature within the plurality of candidate feature by calculating the intra-cluster distances of the samples according to the expected classification results and calculating the inter-cluster distances of the clusters.

As detailed above, in some examples the systems and methods described herein may perform an exhaustive search of distance functions and features to identify an optimal distance function and set of features. However, in some examples (e.g., where there is a very large set of candidate distance functions and/or a very large set of candidate features), the systems described herein may use a combinatorial search technique and/or an evolutionary algorithm to select the distance function and features.

Returning to FIG. 3, at step 310 one or more of the systems described herein may cluster the plurality of samples using the set of features and the distance function. For example, at step 310 clustering module 108 may, as part of computing device 202 in FIG. 2, cluster samples 210 using features 242 and distance function 244.

Clustering module 108 may cluster the plurality of samples using the selected features and selected distance function in any suitable manner. For example, clustering module 108 may use a connectivity-based clustering algorithm to cluster the plurality of samples.

In some examples, clustering module 108 may also classify at least one sample within the plurality of samples according to a cluster in which the samples falls after clustering the plurality of samples using the set of features and the distance function. For example, clustering module 108 may determine that the sample has fallen in a cluster with an additional sample that has already been classified. Clustering module 108 may, accordingly, classify the sample with the same classification as the additional sample.

In one example, the systems described herein may select an optimal distance function and feature set for clustering a set of data samples by iterating through candidate distance functions and, for each candidate distance function, iterating through candidate feature sets to find a distance function and feature set that best fits a set of training samples that are related to (e.g., the same type as) the set of data samples to be clustered. This approach may produce improved clustering results for the set of data samples.

Figure 5:
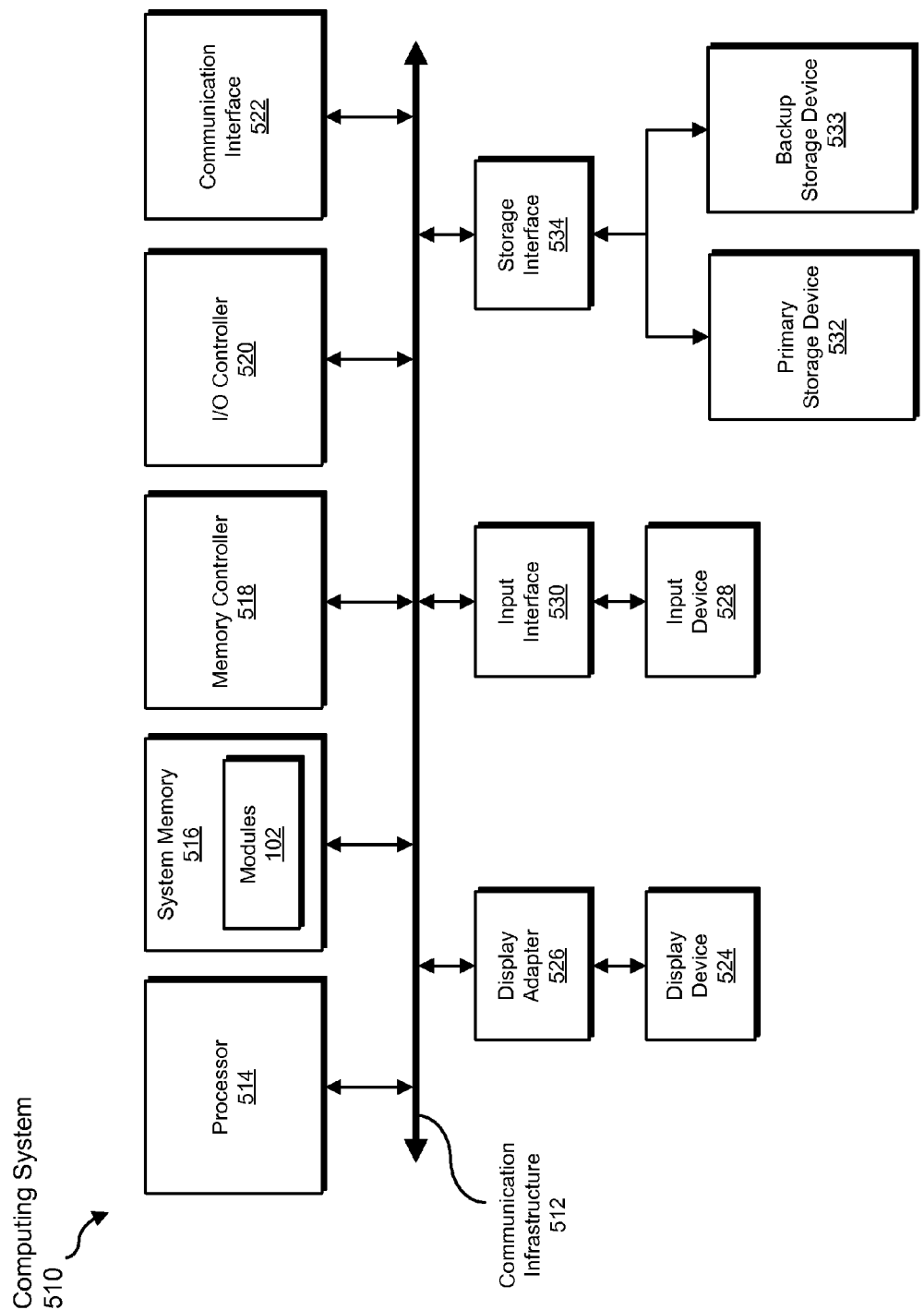
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, selecting, determining, ordering, iterating, clustering, and classifying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
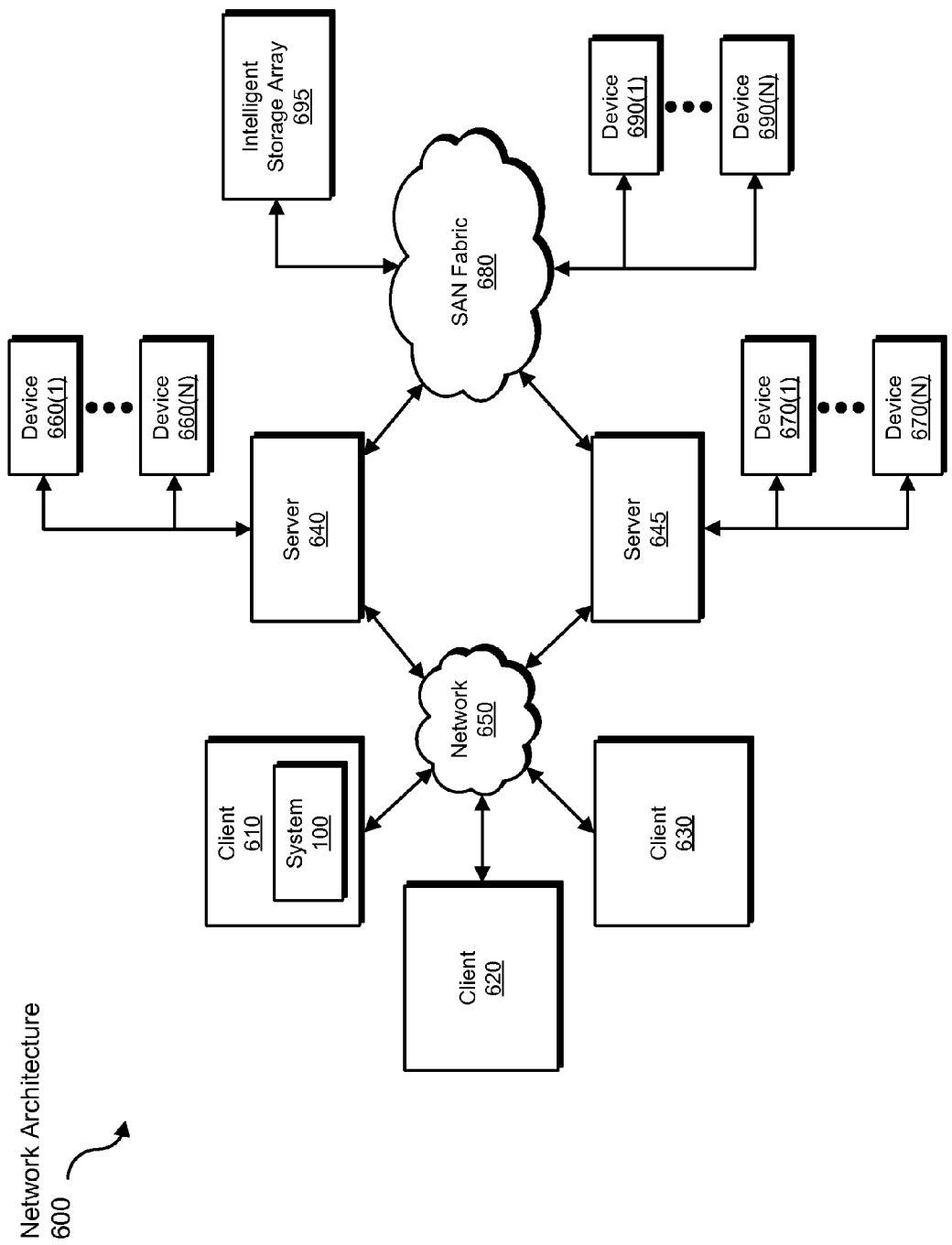
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, selecting, determining, ordering, iterating, clustering, and classifying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for clustering data samples.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a set of data samples to be transformed, transform the data samples into a clustering of data samples, output a result of the transformation to a storage device, use the result of the transformation to classify the data samples, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for clustering data samples, at least a portion of the method being performed by a computing device comprising at least one processor, the method comprising:
   identifying a plurality of samples to cluster;
   identifying a plurality of candidate features for clustering the plurality of samples;
   identifying a plurality of candidate distance functions for clustering the plurality of samples;
   selecting a distance function from the plurality of candidate distance functions for clustering the plurality of samples at least in part by:
      selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric;
      determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric;
   clustering the plurality of samples using the set of features and the distance function.

2. The computer-implemented method of claim 1, wherein:
   the set of features comprises a subset of the plurality of features;
   the alternative set of features comprises the subset and an additional feature from within the plurality of features;
   selecting the set of features comprises adding the additional feature with the set of features to create the alternative set of features to determine whether the additional feature improves upon the result of clustering according to the predefined clustering accuracy metric.

3. The computer-implemented method of claim 1, wherein:
   the alternative set of features comprises a subset of the plurality of features;
   the set of features comprises the subset and an additional feature from within the plurality of features;
   selecting the set of features comprises adding the additional feature with the alternative set of features to create the set of features to determine whether the additional feature improves upon the result of clustering according to the predefined clustering accuracy metric.

4. The computer-implemented method of claim 1, wherein:
   the plurality of samples comprises a plurality of malware samples;
   the training set of samples comprises a set of malware variants from a plurality of malware families;
   the predefined clustering accuracy metric comprises a level of correspondence between at least one cluster of the plurality of malware samples and at least one malware family of the plurality of malware families.

5. The computer-implemented method of claim 1, wherein selecting the set of features comprises:
   ordering the plurality of candidate features by single-feature clustering efficacy to create an ordered list of candidate features;
   iterating through the ordered list of candidate features and adding to the set of features each candidate feature from the ordered list of candidate features that improves clustering of the training set of samples when added to the set of features.

6. The computer-implemented method of claim 1, wherein the predefined clustering accuracy metric comprises at least one of:
   a measure of inter-cluster distance;
   a measure of intra-cluster closeness.

7. The computer-implemented method of claim 1, further comprising classifying at least one sample within the plurality of samples according to a cluster in which the sample falls after clustering the plurality of samples using the set of features and the distance function.

8. A system for clustering data samples, the system comprising:
   an identification module programmed to:
      identify a plurality of samples to cluster;
      identify a plurality of candidate features for clustering the plurality of samples;
      identify a plurality of candidate distance functions for clustering the plurality of samples;
   a selection module programmed to select a distance function from the plurality of candidate distance functions for clustering the plurality of samples at least in part by:
      selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric;
      determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric;
   a clustering module programmed to cluster the plurality of samples using the set of features and the distance function;
   at least one processor configured to execute the identification module, the selection module, and the clustering module.

9. The system of claim 8, wherein:
the set of features comprises a subset of the plurality of features;
the alternative set of features comprises the subset and an additional feature from within the plurality of features;
selecting the set of features comprises adding the additional feature with the set of features to create the alternative set of features to determine whether the additional feature improves upon the result of clustering according to the predefined clustering accuracy metric.

10. The system of claim 8, wherein:
the alternative set of features comprises a subset of the plurality of features;
the set of features comprises the subset and an additional feature from within the plurality of features;
the selection module is programmed to select the set of features by adding the additional feature with the alternative set of features to create the set of features to determine whether the additional feature improves upon the result of clustering according to the predefined clustering accuracy metric.

11. The system of claim 8, wherein:
the plurality of samples comprises a plurality of malware samples;
the training set of samples comprises a set of malware variants from a plurality of malware families;
the predefined clustering accuracy metric comprises a level of correspondence between at least one cluster of the plurality of malware samples and at least one malware family of the plurality of malware families.

12. The system of claim 8, wherein the selection module is programmed to select the set of features by:
ordering the plurality of candidate features by single-feature clustering efficacy to create an ordered list of candidate features;
iterating through the ordered list of candidate features and adding to the set of features each candidate feature from the ordered list of candidate features that improves clustering of the training set of samples when added to the set of features.

13. The system of claim 8, wherein the predefined clustering accuracy metric comprises at least one of:
a measure of inter-cluster distance;
a measure of intra-cluster closeness.

14. The system of claim 8, wherein the clustering module is further programmed to classify at least one sample within the plurality of samples according to a cluster in which the sample falls after clustering the plurality of samples using the set of features and the distance function.

15. A non-transitory computer-readable medium comprising one or more computer-executable instructions that, when executed by at least one processor of a computing device, cause the computing device to:
identify a plurality of samples to cluster;
identify a plurality of candidate features for clustering the plurality of samples;
identify a plurality of candidate distance functions for clustering the plurality of samples;
select a distance function from the plurality of candidate distance functions for clustering the plurality of samples at least in part by:
selecting a set of features from the plurality of candidate features for clustering the plurality of samples based at least in part on determining that a result of clustering a training set of samples using the set of features and the distance function fits an expected clustering of the training set of samples more closely than an additional result of clustering the training set of samples using an alternative set of features from the plurality of candidate features and the distance function, according to a predefined clustering accuracy metric;
determining that the result of clustering the training set of samples using the set of features and the distance function fits the expected clustering of the training set of samples more closely than a best result of clustering the training set of samples for each candidate distance function, aside from the distance function, within the plurality of candidate distance functions, according to the predefined clustering accuracy metric;
cluster the plurality of samples using the set of features and the distance function.

16. The non-transitory computer-readable medium of claim 15, wherein:
the set of features comprises a subset of the plurality of features;
the alternative set of features comprises the subset and an additional feature from within the plurality of features;
selecting the set of features comprises adding the additional feature with the set of features to create the alternative set of features to determine whether the additional feature improves upon the result of clustering according to the predefined clustering accuracy metric.

17. The non-transitory computer-readable medium of claim 15, wherein:
the alternative set of features comprises a subset of the plurality of features;
the set of features comprises the subset and an additional feature from within the plurality of features;
selecting the set of features comprises adding the additional feature with the alternative set of features to create the set of features to determine whether the additional feature improves upon the result of clustering according to the predefined clustering accuracy metric.

18. The non-transitory computer-readable medium of claim 15, wherein:
the plurality of samples comprises a plurality of malware samples;
the training set of samples comprises a set of malware variants from a plurality of malware families;
the predefined clustering accuracy metric comprises a level of correspondence between at least one cluster of the plurality of malware samples and at least one malware family of the plurality of malware families.

19. The non-transitory computer-readable medium of claim 15, wherein selecting the set of features comprises:
ordering the plurality of candidate features by single-feature clustering efficacy to create an ordered list of candidate features;
iterating through the ordered list of candidate features and adding to the set of features each candidate feature from the ordered list of candidate features that improves clustering of the training set of samples when added to the set of features.

20. The non-transitory computer-readable medium of claim 15, wherein the predefined clustering accuracy metric comprises at least one of:
a measure of inter-cluster distance;
a measure of intra-cluster closeness.

* * * * *